United States Patent
Vepa et al.

(10) Patent No.: US 6,694,369 B1
(45) Date of Patent: Feb. 17, 2004

(54) TAG ECHO DISCOVERY PROTOCOL TO DETECT REACHABILITY OF CLIENTS

(75) Inventors: RamKrishna Vepa, Danville, CA (US); James Binder, San Jose, CA (US); Glenn Connery, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/539,923

(22) Filed: Mar. 30, 2000

(51) Int. Cl.[7] .................. G06F 15/16; G06F 15/177
(52) U.S. Cl. .................. 709/228; 709/221; 709/203
(58) Field of Search ........................... 709/221, 228, 709/223, 225, 220; 370/254, 401, 466, 255; 713/1

(56) References Cited

U.S. PATENT DOCUMENTS

| | | | | |
|---|---|---|---|---|
| 5,684,800 A | * | 11/1997 | Dobbins et al. | ............ 370/401 |
| 5,751,967 A | * | 5/1998 | Raab et al. | ................. 709/228 |
| 5,752,003 A | * | 5/1998 | Hart | ........................... 709/223 |
| 5,926,463 A | * | 7/1999 | Ahearn et al. | .............. 370/254 |
| 5,968,126 A | * | 10/1999 | Ekstrom et al. | ............ 709/225 |
| 6,061,334 A | * | 5/2000 | Berlovitch et al. | ......... 370/255 |
| 6,223,218 B1 | * | 4/2001 | Iijima et al. | ................. 709/221 |
| 6,252,888 B1 | * | 6/2001 | Fite et al. | ................... 370/466 |
| 6,256,314 B1 | * | 7/2001 | Rodrig et al. | .............. 370/401 |
| 6,377,987 B1 | * | 4/2002 | Kracht | ....................... 709/220 |
| 6,446,200 B1 | * | 9/2002 | Ball et al. | ..................... 713/1 |

* cited by examiner

*Primary Examiner*—David Wiley
*Assistant Examiner*—Michael Delgado

(57) ABSTRACT

A method for detecting reachability of client computers communicatively coupled in a computer network to a server computer. A plurality of identifier tags are resident in the memory of the server. The server generates a data packet comprising an I.C.M.P. echo packet and selects a first identifier tag from among the plurality of identifier tags resident in memory, the first identifier tag being chosen to correspond to a first client computer. The server inserts the first identifier tag into the proper data segment of the echo packet and forwards the packet to the first client. After a predetermined time awaiting a responsive ping from the client, the server determines if the client is tag-compliant or non tag-compliant.

26 Claims, 12 Drawing Sheets

TAG ECHO DISCOVERY PROTOCOL TO DETECT REACHABILITY OF CLIENTS

BACKGROUND OF THE INVENTION

1. Field of the Invention

The present invention relates to the field of computer system networks. In particular, the present invention pertains determining the current status and reachability of a specific client computer.

2. Description of the Related Art

The increasing levels of communication taking place between computers has given rise to increasing need for specialized networks that can insure inexpensive and timely transmission of data. A LAN (Local Area Network) is a group of computers connected by a common communication network. One of the goals of the earlier LANs was to avoid transmission using the Public Switched Telephone Network, (PSTN) which could result in undue delays, as well as ongoing costs which are avoidable through a LAN. With increasing sophistication of digital electronics, LANs can be segregated into sub-nets called virtual LANs (VLANs). A sub net is a select group of computers on a net that have some common object, goal or function which distinguishes them from other network computers.

The operation and utility of a VLAN can be illustrated by an example of a modern hospital, where computers are interconnected for communication. VLANs would further break down the hospital into smaller units. Patient health records, accounts receivable, disbursing, employee health benefits, pathology, neurology and ophthalmology each have separate concerns. Some memoranda, such as an upcoming Christmas party, might be relevant to all hospital employees. Other memoranda might be relevant only to those persons in accounts receivable. If all memoranda generated within the hospital were forwarded to all hospital personnel at all times, the time to read the memoranda could consume every working minute of every employee. Physicians would be so inundated with irrelevant memos that the healing of the sick would grind to a halt.

Virtual LANs provided a major step in solving this problem. Even though all computers in this hospital are on the same communication network, by using distinct VLAN identifier tags typically placed in the header of a message, only those computers capable of recognizing that particular identifier tag would process the memo. Accounts receivable would have its own identifier tag, as would disbursing, ophthalmology, the pathology lab, and every other department. The practical implementation of VLANs has proven somewhat problematic however.

The first problem is that many computer networks are heterogeneous, comprising both "compliant" client computers (able to read VLAN identifier tags), and "non-compliant" computers, which cannot recognize a message header containing the bit field required for a VLAN tag. If a message with a VLAN identifier tag is sent to a non-compliant computer, the message is simply ignored.

One solution to this problem has been the use of electronically configurable switches. To accommodate computers which are non-compliant, an individual port on a configurable switch can be configured to strip out any VLAN identifier tag. The message header is thereby reformatted to a form that is recognizable by a non-compliant computer.

A "stack network" using such configurable switches however creates its own set of problems. If a user were to unplug a computer from its normal communication port on the LAN, and plug in to a communication port one desk away, the two ports may be routed into different ports on the configurable switches leading to the server computer. One port may be configured for compliant computers, and the other for non-compliant computers. By simply changing port connections, a client computer can thereby degrade its ability to communicate on the LAN.

A similar problem would be upgrading a client from non-compliant status to compliant status. Just as the bit field of a VLAN identifier tag renders the packet header unrecognizable to a legacy (non-compliant) computer, a compliant computer can not use VLAN identifier when communicating with a legacy computer.

Another problem with "stack networks" is their ability to segregate a network. Even if two "intelligent" switch ports are configured for compliant computers, they may each be dedicated to different VLAN identifier tags. If there were ten separate VLANs on the LAN, port 1 may limit its transmissions to messages with VLAN identifier #1, and strip out all other transmissions. Port 2 may similarly limit transmissions to messages with VLAN identifier tag #2. Accordingly, if someone were to take a computer to another location on the LAN, even if both locations were compliant, the client computer might be unable to receive transmissions in its new location.

Transmissions also go from a client to a server. If a heterogeneous mix of compliant and non-compliant clients were communicating to a server, the transmissions in a stack network would again go through configurable switches. To insure that all messages reach the server with the same size bit field in the header, a switch-port serving a non-compliant computer can be configured to insert a "universal VLAN tag" (a bit field the same size as a normal VLAN identifier tag) into the proper location in the message header, thereby enabling the server to receive and respond to the transmission. While solving one problem however, this process again creates another problem. If a switch port were configured to communicate with a legacy (non-compliant) client, and an upgraded (compliant) computer were to connect to that port, the client would now be sending a message with a VLAN identifier tag in the header.

One solution has been to employ a Management Information Specialist (MIS) to maintain a LAN. Switches and routers are continually reconfigured by the MIS to reflect the dynamics of VLAN usage. If a client computer at a given port is upgraded from non-compliant to compliant, the outlet ports on the switches are reconfigured by the MIS. Once again, however, a solution becomes a problem. Networks may have a thousand or more computers. A large network may require an entire staff of Management Information Specialists to maintain a network. This obviously increases operational costs of a company. Moreover, even the most efficient maintenance staff is unlikely to be able to reconfigure the network in such a timely manner that no transmissions are ever dropped. Any lag time in reconfiguration can result in lost transmissions.

Finally, with or without a stack-network of configurable switches, one problem remains wholly unresolved. When a message is rejected by a client, the server has no way of knowing that a message has gone undelivered. Therefore, the server will make no effort to re-send the message in a more readable format.

A need therefore exists for a method and apparatus for allowing a server to communicate to client computers on a heterogeneous network of compliant and non-compliant computers. A further need exists for a method and apparatus that will allow efficient communication on a dynamic network where compliant and non-compliant computers may be interchanged at various network communication ports. A further need exists for a method and apparatus of determining whether a client computer is compliant or non-compliant before attempting to transmit data to that client computer. A further need exists for determining with a high probability whether transmission from a server to a client was successfully executed. A further need exists for a method and apparatus that will respond to dynamic changes in the status of client computers by reconfiguring itself without the need of a costly maintenance staff. A further need exists for a method and apparatus that will respond to dynamic changes in the status of client computers by reconfiguring itself in-or-near real time, thereby avoiding the failed communications that necessarily attend a lengthy or delayed reconfiguration. A further need exists for portability in a network communications system, wherein computers can be moved to different ports of a network without degrading the communication ability of that network.

SUMMARY OF THE INVENTION

The present invention provides a system and method allowing a server to communicate to client computers on a heterogeneous network of compliant and non-compliant computers. The present invention further provides a method and apparatus that will allow efficient communication on a dynamic network where compliant and non-compliant computers may be interchanged at various network communication ports. The present invention further provides a system and method for determining whether a client computer is compliant or non-compliant before attempting to transmit data to that client computer. The present invention further provides a system and method for determining with a high probability whether transmission from a server to a client was successfully executed. The present invention further provides a system and method for a server to respond to dynamic changes in the status of client computers by reconfiguring itself without the need of a costly maintenance staff. The present invention further provides a system and method that will respond to dynamic changes in the status of client computers by reconfiguring itself in-or-near real time, thereby avoiding the failed communications that necessarily attend a lengthy or delayed reconfiguration. The present invention further provides a system and method for portability in a network communications system, wherein computers can be moved to different ports of a network without degrading the communication ability of that network.

According to one embodiment of the present invention, the reachability of client computers communicatively coupled in a computer network to a server computer is determined. The server uses an I.C.M.P. "ping" in place of the data payload of a normal message, and then inserts a VLAN identifier tag into the proper data segment of the header of the packet. This tagged packet is transmitted on a network to determine if a client corresponding to that identifier tag is present on the network and able to read the identifier tag. A client computer that cannot recognize a message header containing a VLAN tag will simply ignore the message. Therefore, if the client computer transmits a ping response within a predetermined period of time, the client is known to be compliant with the identifier tags, and the server memory is updated to reflect the "compliant" status of the client computer. If no responsive echo is received after a predetermined time period, the client is known to be non-compliant. The server memory contains a plurality of identifier tags along with their last known status. If, as a result of the tagged ping-packet transmission the results of the client status are determined to have changed, the memory is updated accordingly.

These and other objects and advantages of the present invention will become obvious to those of ordinary skill in the art after reading the following detailed description of the preferred embodiments which are illustrated in the various drawing figures.

DETAILED DESCRIPTION OF THE PREFERRED EMBODIMENTS

Figure 1:
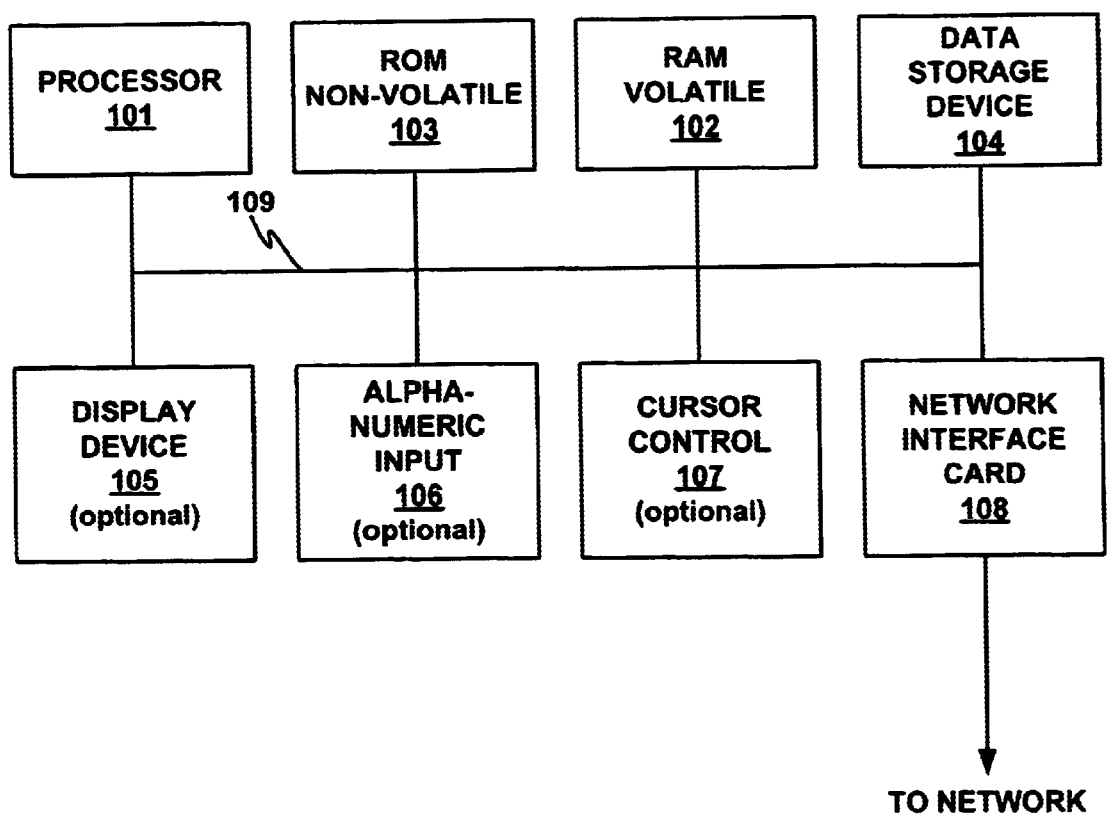
FIG. 1 depicts a general purpose server computer system upon which embodiments of the present invention may be implemented in accordance with one embodiment of the present claimed invention.

Reference will now be made to the preferred embodiment of the invention, a tag echo discovery system using VLAN identifier tags, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are frequently set forth in order to conceptually illustrate the workings of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. These steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "associating" or "storing" or "reading" or "sending" or "initiating" or "replacing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention pertains to a method and apparatus for determining the reachability and status of client computers in a heterogeneous network comprising tag-compliant and tag-non-compliant client computers. Although the present invention is discussed largely in the context of VLAN, 802.1 p/Q identifier tags, and I.C.M.P. ping packets, it is understood that other protocols, identifier tags, or ping-echo technology, as exist now or as developed in the future, may be utilized in accordance with the present invention.

FIG. 1 discloses an exemplary server computer system 100 upon which embodiments of the present invention may be practiced. The server computer system 100 is communicatively coupled to other computer systems (not shown) in a network through a network interface card 108.

In general, server computer system 100 used by the embodiments of the present invention comprises a central processor 101 for processing information and instructions, a random access memory 102 for storing information and instructions for central processor 101, a read only memory 103 for storing static information and instructions for central processor 101, a data storage device 104 such as a magnetic or optical disk and disk drive for storing information and instructions, an optional display device 105 for displaying information to the computer user, an optional alphanumeric input device 106 including alphanumeric and function keys for inputting information and command selections to the central processor 101, an optional cursor control device 107 for inputting user input information and command selections to the central processor 101, a network interface card 108 for transmitting and receiving from the central processor 101 to the network (not shown), and a bus 109 communicatively connecting the central processor 101, the random access memory 102, the read only memory 103, the data storage device 104, the optional display device 105, the optional alpha numeric input 106, the optional cursor control 107, and the network interface card 108.

Display device 105 of FIG. 1 utilized with the server computer system 100 of the present embodiment may be a liquid crystal device, cathode ray tube, or other display device suitable for creating graphic images and alphanumeric characters recognizable for the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor detecting devices.

Figure 2:
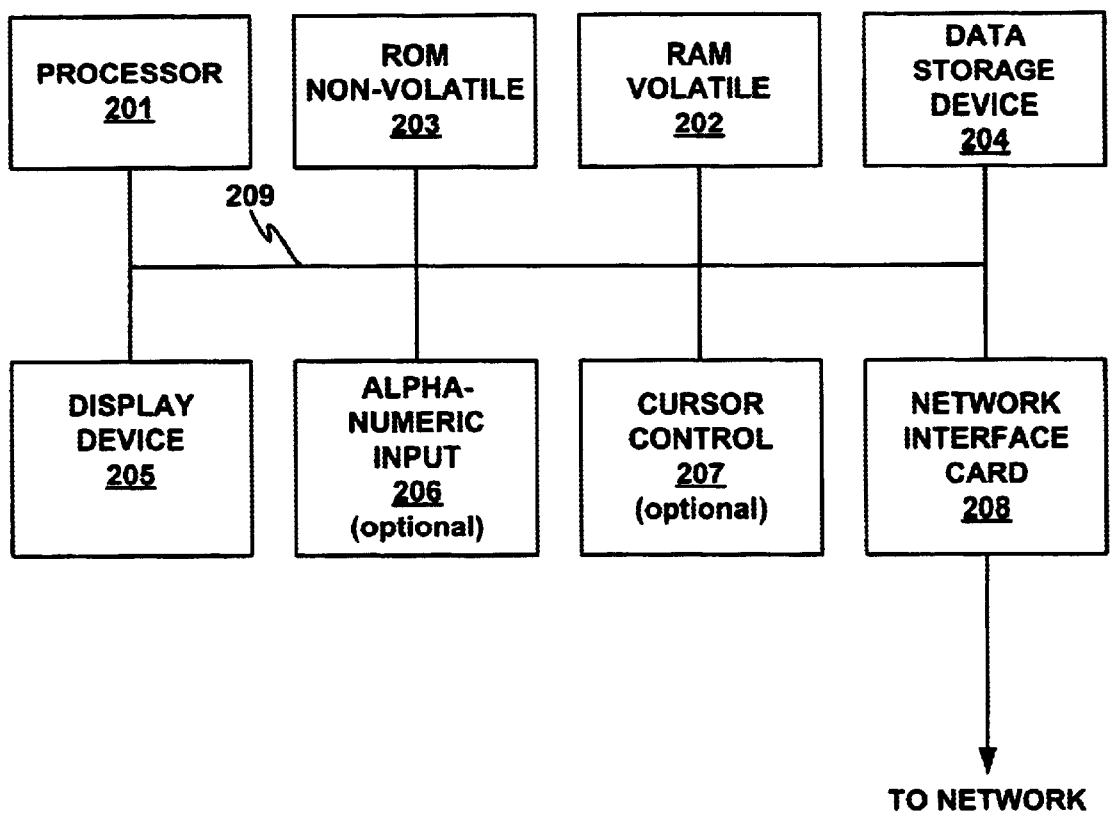
FIG. 2 depicts a general purpose client computer system upon which embodiments of the present invention may be implemented in accordance with one embodiment of the present claimed invention.

FIG. 2 discloses a general purpose client computer system 200 upon which embodiments of the present invention may be implemented. Client computer system 200 is communicatively coupled to the server computer 100 shown in FIG. 1 by means of network interface card 208 that connects the client computer to the network (not shown). In general, processor 201, random access memory 202, read only memory 203, data storage device 204, optional display device 205, optional alphanumeric input device 206, optional cursor control device 207, and bus 209 function and interact as described in conjunction with FIG. 1. Although computer systems 100 and 200 are shown having network interface cards 108 and 208, respectively, the present invention is also well suited to an embodiment in which computer systems 100 and 200 are coupled to the network or each other using means other than a network interface card.

Figure 3:
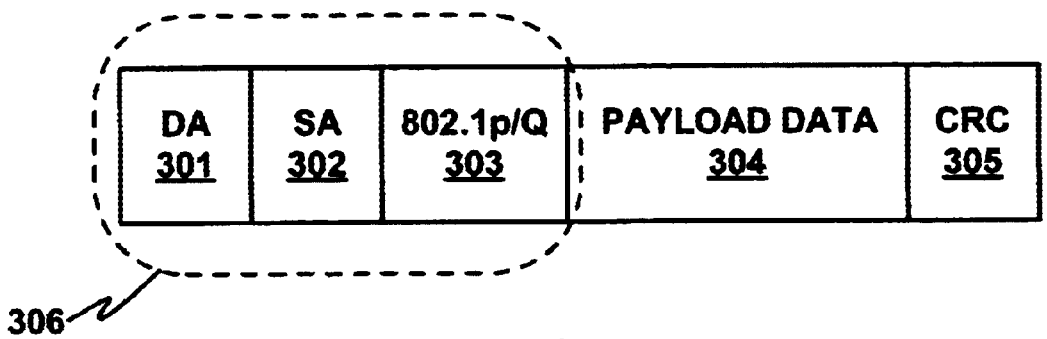
FIG. 3 depicts a digital VLAN data packet containing payload data implemented in accordance with one embodiment of the present claimed invention.
Figure 3A:
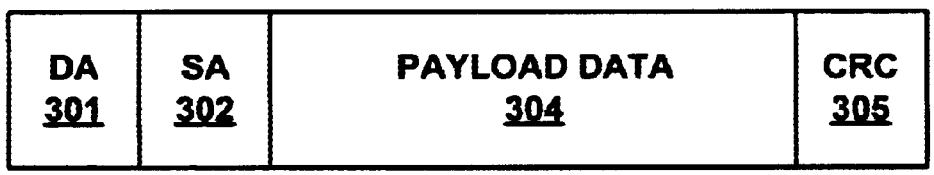
FIG. 3A depicts the data packet of FIG. 3, but lacking the VLAN tag in accordance with one embodiment of the present claimed invention.

FIG. 3 depicts one embodiment of a digital data packet containing a data payload. The data packet 300 can represent a bit sequence stored in memory, or a bit stream being transmitted. Destination address "DA" 301 contains a bit sequence representing a computer or station being targeted to receive the data packet 300. Source address SA 302 contains a bit sequence representing the address of the computer from which the data packet originated.

The optional 802.1 p/Q "VLAN identifier tag" 303 is a four-byte field comprising a fixed Ethertype VLAN identification number and a "Quality of Service" or QoS number. The VLAN I.D. defines a particular virtual LAN to which the source is communicating, and only computers configured to recognize that VLAN I.D. number will receive the message. The QoS number determines that, if a variety of messages are in a queue, rather than transmitting the messages in a "first in, first out" manner, a computer will prioritize the messages according the their QoS number, thereby insuring that the most time critical messages are transmitted first. Together, the destination address 301, the source address 302 and the VLAN tag 303 comprise at least a portion of the message "header" 306.

For purposes of the present application, "compliant" computers are those computers on a VLAN that are configured to recognize a particular 802.1 p/Q bit sequence. When a data packet 300 comprising a VLAN identifier tag 303 is transmitted to a compliant computer, the message will be received and processed. However, when a data packet 300 comprising a VLAN identifier tag 303 is transmitted to a non-compliant computer, the message will be ignored or "dropped." Similarly, if transmitted to another compliant computer that has not been configured to recognize that particular VLAN tag, the message will again be ignored.

The payload data 304 comprises the actual file or data being transmitted. It could be a memorandum, spread sheet, digital photograph, or any other data pattern that the source has chosen to transmit.

The cyclical redundancy check CRC 305 is an error checking technique to insure that data has not been not corrupted in transmission. A computer transmitting the data will take the bit stream being transmitted and perform a mathematical reduction upon the bit pattern of the message. The mathematical algorithm is typically chosen such that a small one-bit difference in the payload data will produce a radically different bit pattern when mathematically reduced, such as polynomial division. The resultant number is the bit pattern forming the CRC 305, which typically is transmitted as a tail on the data packet. When the transmission is received, the receiving computer reduces the bit stream according to the identical algorithm, generating a comparison number. The receiving computer then compares the comparison number to the CRC 305 received within the data packet 300. If the numbers are identical, there is a strong likelihood that the transmission was uncorrupted. If the numbers are different, the transmission was corrupted, and the message is discarded.

Figure 4:
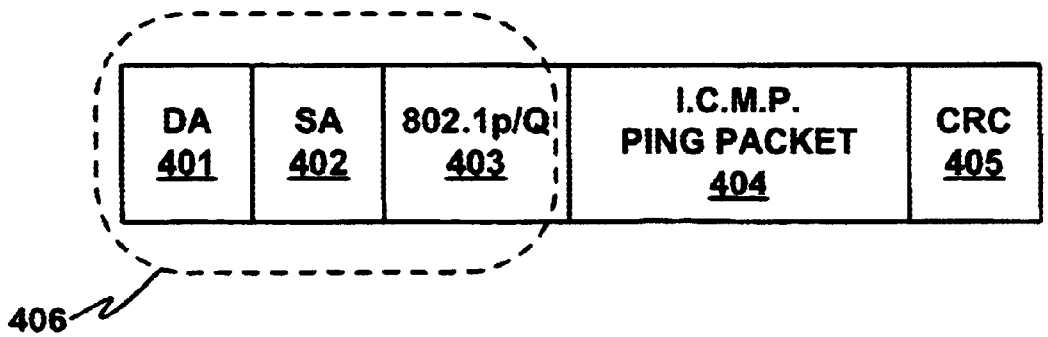
FIG. 4 depicts a digital VLAN data packet containing an I.C.M.P. ping packet in place of the normal data payload in accordance with one embodiment of the present claimed invention.

FIG. 4 depicts a digital VLAN ping/echo packet 400 comprising an 802.1 p/Q VLAN identifier tag 403 and an I.C.M.P. ping packet 404 structure in accordance with one embodiment of the present invention. A brief overview of the processes of the present invention is recited below. This brief overview is followed by a detailed description of the operation of the present invention. The destination address 401, source address 402, VLAN 802.1 p/Q identifier tag 403, and CRC 405 function the same as in FIG. 3. In the present embodiment, when the VLAN ping/echo packet 400 disclosed in FIG. 4 is transmitted to a compliant computer 200 configured to recognize the 802.1 p/Q VLAN identifier tag 403, the client 200 will receive and process the packet. I.C.M.P. ping packet 404 is a program command that initiates an echo response from the receiving computer. When the client computer 200 therefore generates a responsive data packet and transmits within a predetermined time frame, the server 100 will receive the transmission and knows that the client assigned to that VLAN identifier tag is compliant.

Furthermore, in the present embodiment, if the client computer is unable to recognize the VLAN tag, it will simply ignore the packet. Therefore, if a server 100 transmits the VLAN ping/echo packet 400 disclosed in FIG. 4 and no echo response is received in the allotted time, the server computer 100 determines that the client assigned that VLAN I.D. is non-compliant. In one embodiment, the ping is retransmitted a few times to make certain that the client is receiving and ignoring the ping.

Figure 5:
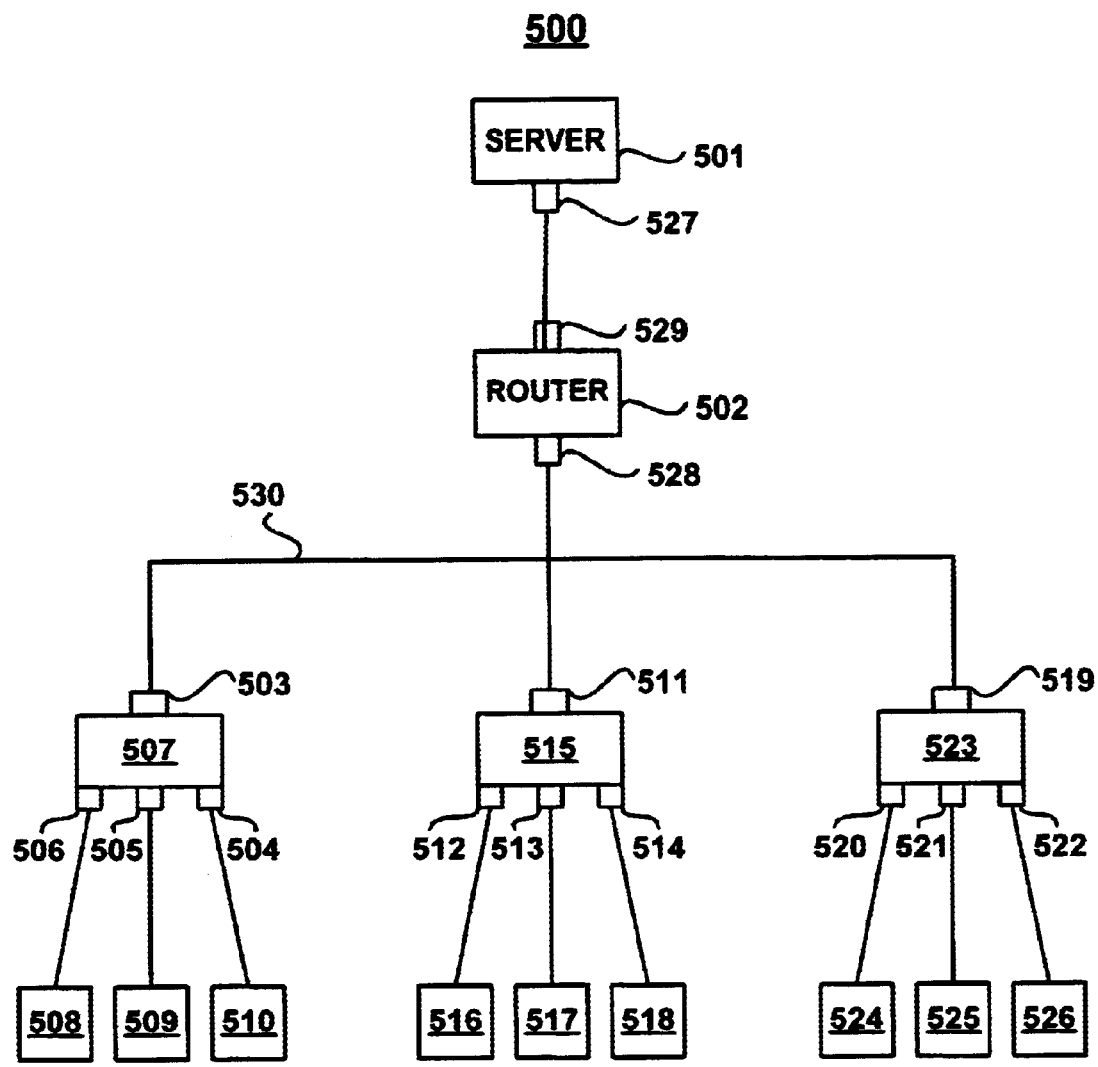
FIG. 5 depicts a stack network configuration with a single server and multiple clients implemented in accordance with one embodiment of the present claimed invention.

FIG. 5 discloses a stack network configuration 500 utilized in accordance with one embodiment of the present invention. A single server 501 transmits through a communication port 527 to a network. Any number of intermediary routers 502 comprising an inlet and an outlet port 528, 529 may be disposed between the server 501 and the network switches 507, 515 and 523. From outlet port 528, the router 501 relays signals from the server 501 along the network communication path 530 to the inlet ports 503, 511, 519 on network switches 507, 515, 532. The outlet ports 504, 505, 506, 516, 517, 518, 524, 525 and 526 on the network switches 507, 515 and 523 are individually configurable. An outlet port may therefore be configured to communicate with compliant or non-compliant client computers.

Figure 6:
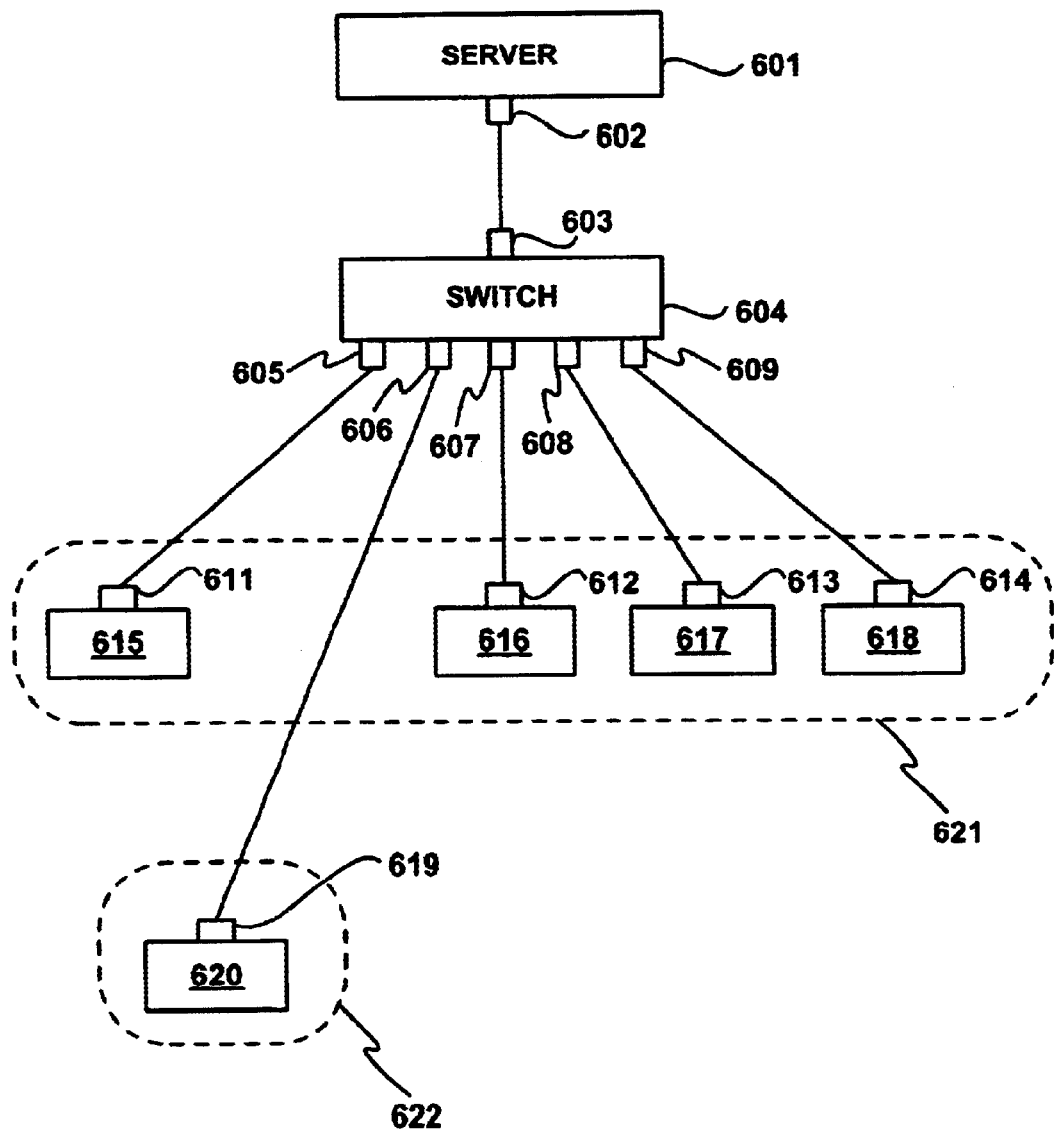
FIG. 6 depicts a stack network, pre-configured for compliant and non-compliant clients implemented in accordance with one embodiment of the present claimed invention.

Referring now to FIG. 6, a stack network 600 is displayed comprising a compliant network portion 621, and a non compliant portion 622. To facilitate communication between server 601 and client 620, communication port 606 would be configured to strip out the 802.1 p/Q VLAN identifier tag 303 from any message being transmitted to client computer 620. A message would be reduced from the packet depicted in FIG. 3 to the packet depicted in FIG. 3-a. Similarly, when signals are sent from client 620 back to server 601, they would lack a VLAN identifier tag 303. If the server were unable to recognize a packet header lacking this bit field, communication port 606 on switch 604 could be configured to insert a 4 byte field in the header where a VLAN identifier tag would normally be found, thereby allowing the signal to reach the server in a format expected by the server.

Alternatively, if client computer 615 were known to be compliant, communication port 605 on switch 604 would be configured to allow the entire packet 300 to pass through the port to the client. A data packet 300 would thereby reach client 615 with the VLAN identifier tag intact.

Figure 7:
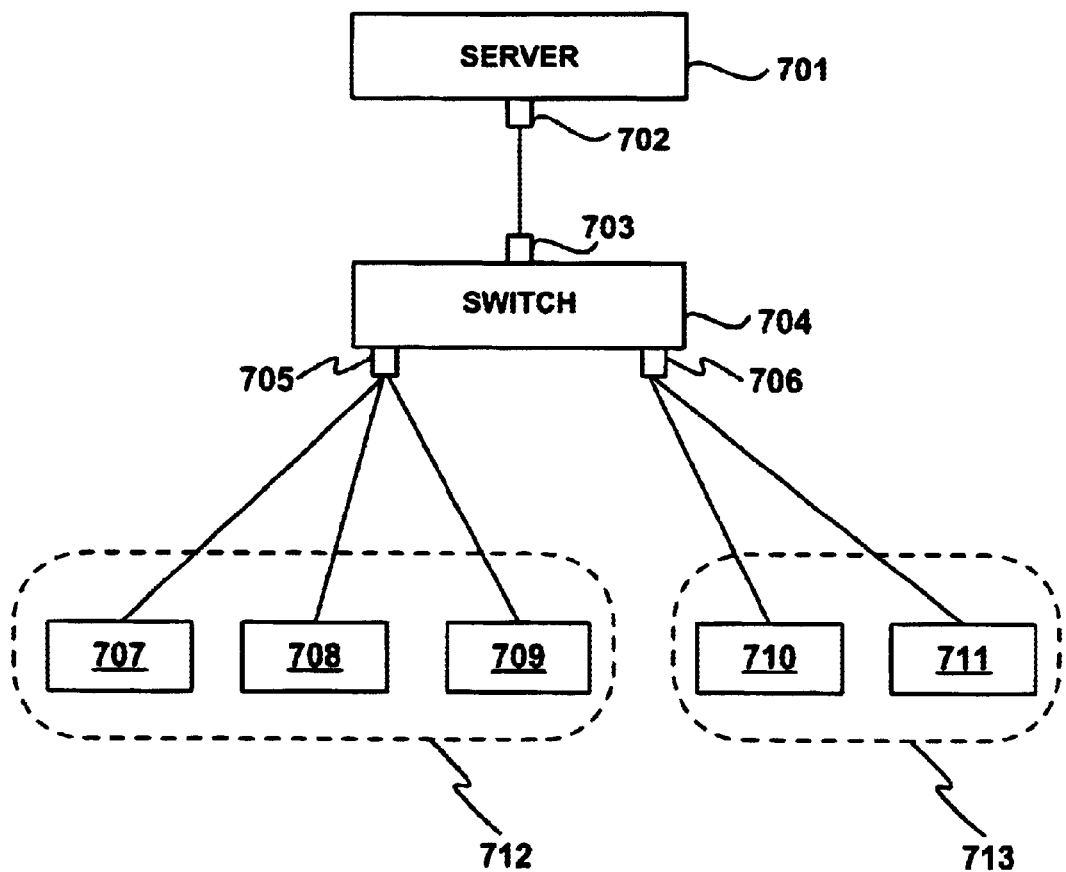
FIG. 7 depicts a stack network with switch communication ports limited to homogenous users.

Referring now to FIG. 7, a stack network 700 controlled by a configurable switch 704 is seen to be controlling transmissions to a compliant portion of the network 712 and a non compliant portion of the network, 713. In a portable environment where laptop computers are moved around, if client 710 were moved to another port which connected to communication port 705 of switch 704, communication between server 701 and client 710 would cease. Similarly, if compliant client computer 707 were plugged into a communication port leading to port 706 on switch 704, communication would similarly break down. Finally, if client 710 were upgraded from non-compliant status to compliant status, it would have to be moved to communication port 705. Similarly, if a new computer were purchased to replace client computer 707, and the new computer had not been configured to recognize VLAN tags, the new computer would be unable to communicate on the network through the same port as the original computer 707. This becomes even more problematic when an alternative communication port is not a convenient distance from client computers 707 or 710.

Figure 8:
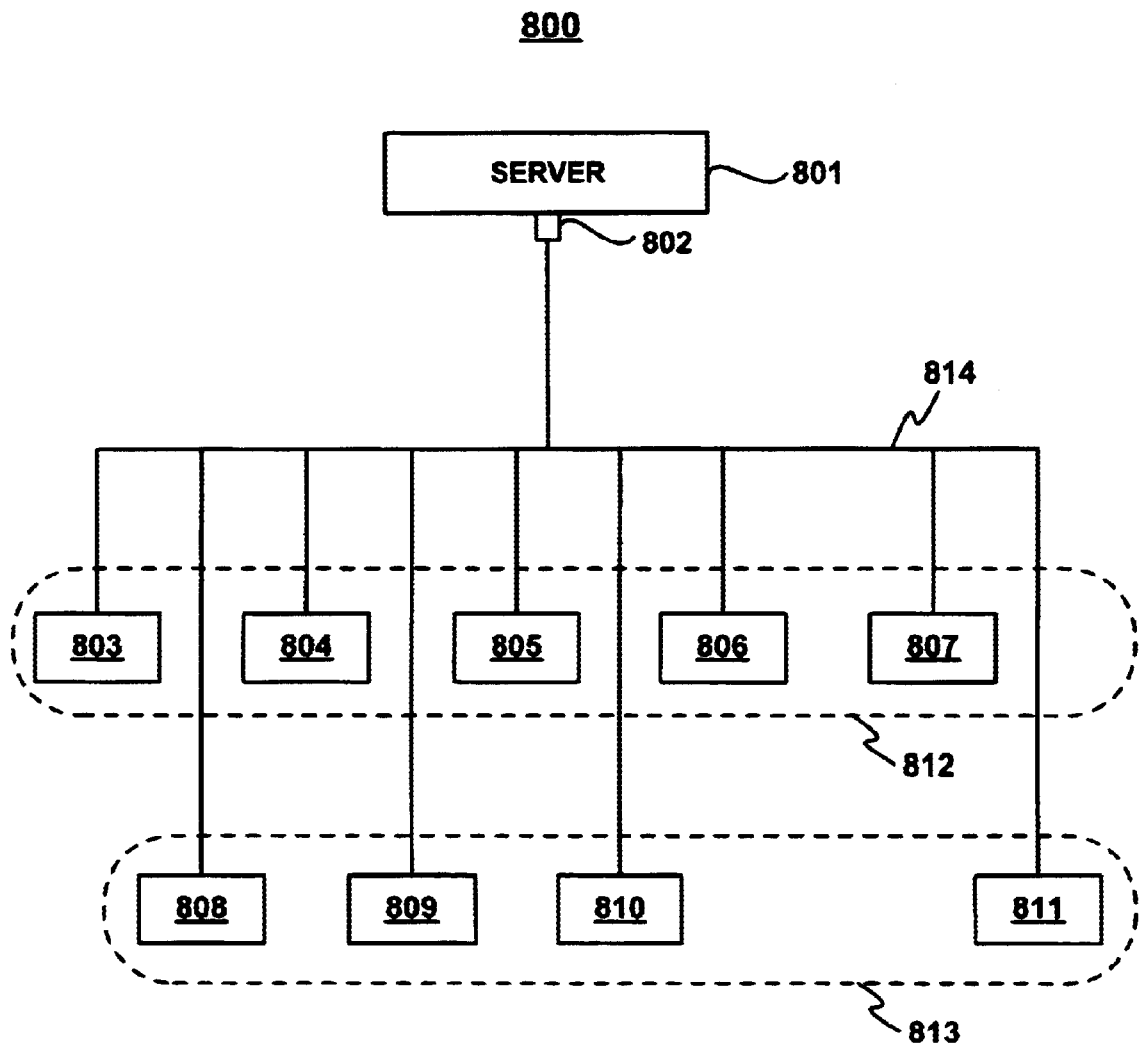
FIG. 8 depicts a parallel network configuration as might be utilized with the present invention, wherein the same communication port may be used to transmit to compliant and non-compliant clients implemented in accordance with one embodiment of the present claimed invention.

FIG. 8 displays a heterogeneous parallel network configuration 800 which could be used advantageously in conjunction with the present invention. A server 801 communicates through communication channel 814 to a network of both compliant computers 812 and non-compliant computers 813. Through employing the invention disclosed herein, no switches or ports need be configured to accommodate individual computers. One obvious benefit of such a network configuration is the elimination of a maintenance staff needed to configure switches and routers comprising a dynamic stack type network. A second benefit is the portability of all computers. A computer may be moved to another port, or a new computer purchased and installed anywhere on the network and still function without being reconfigured.

Figure 9:
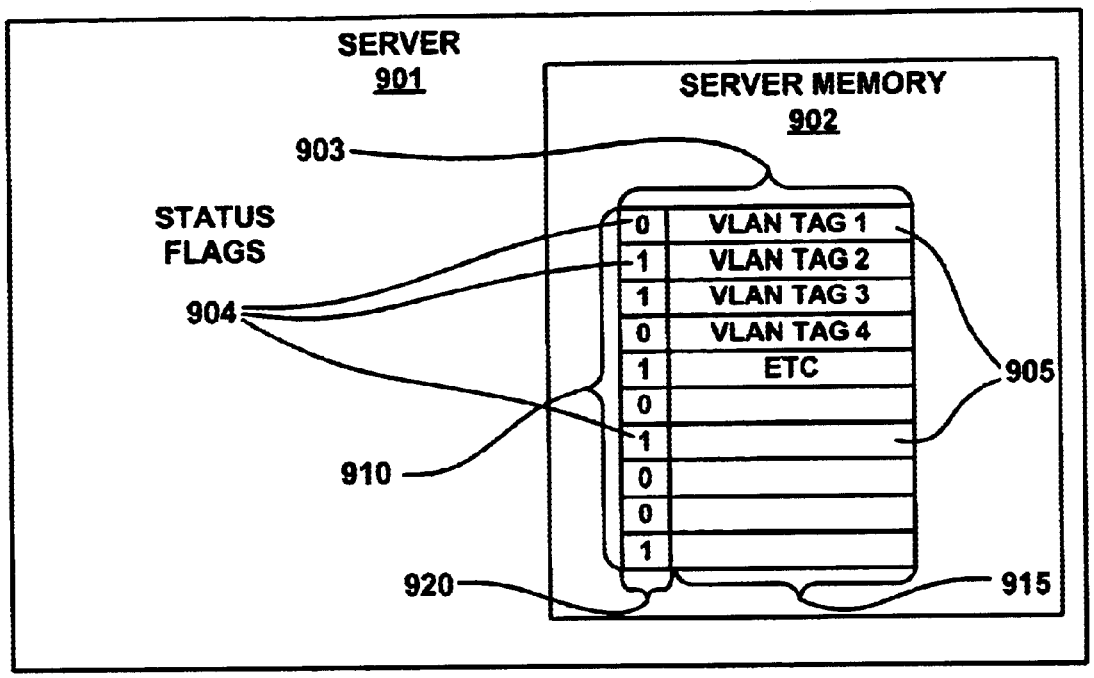
FIG. 9 depicts one embodiment of a memory structure and organization according to the present invention, wherein flags within the memory are used to record status of an identifier tag in accordance with one embodiment of the present claimed invention.

FIG. 9 discloses a memory structure 902 of a server computer 901 according to one embodiment of the present invention. Within the server memory 902 is a reachability file 903 comprising a plurality of records 910. Each record 910 comprises a first field 915 containing one of a plurality of VLAN identifier tags 905, which may or may not be active on the net. Each record 910 further comprises a second field 920 containing a status flags 904, which reflects the status of the client computer corresponding to a given VLAN identifier tag 905. When a VLAN ping/echo packet determines the status of a client computer, the status flag 904 corresponding to the VLAN identifier tag 905 of that computer is examined, and its status is updated in the reachability file 903. The first field 920 (e.g., status flags 904) may contain as little as one bit per flag, which would be sufficient to reflect the compliant/non-compliant status of a client computer. If the status of the client computers is updated frequently enough to be regarded as reliable, the server 902 preparing to transmit a packet to a client computer need not "ping" the client computer to determine the status. The server 901 need simply check the status 904 of a particular client computer in the reachability file 903 maintained in the server's memory 902.

Figure 10:
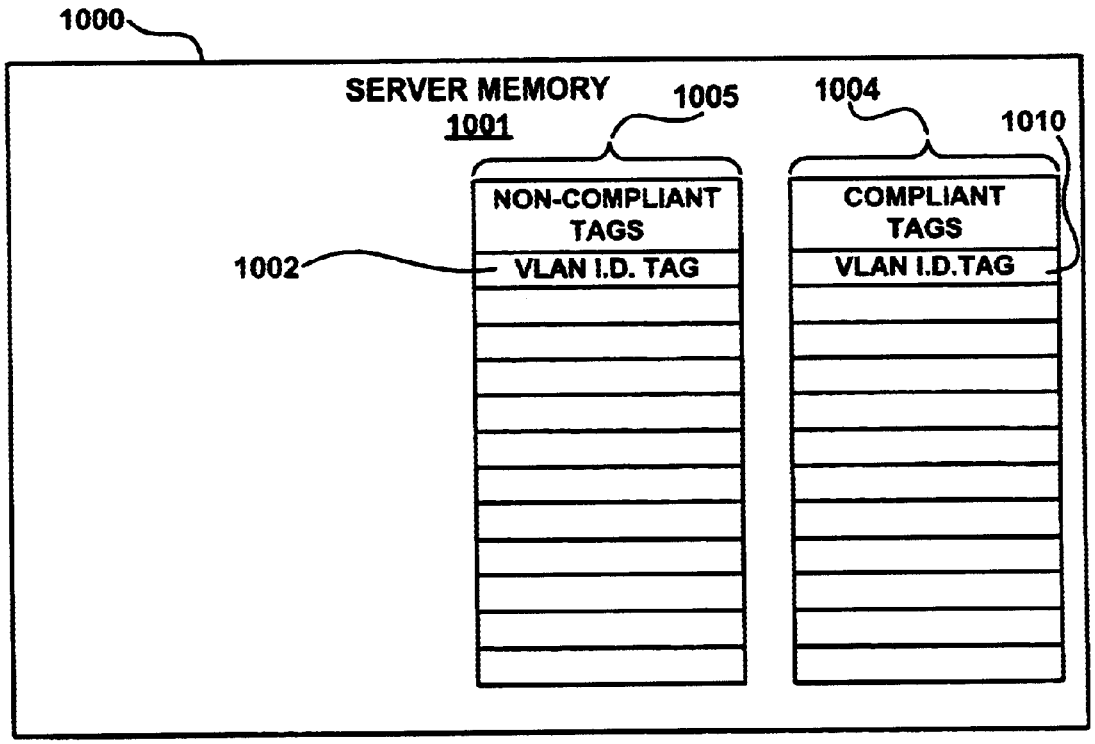
FIG. 10 depicts one embodiment of a memory structure and organization as envisioned with the present invention, wherein identifier tags are segregated into separate files, variously designated as compliant and non-compliant in accordance with one embodiment of the present claimed invention.

Referring now to FIG. 10, an alternative embodiment of the present invention comprises a memory structure 1001 comprising two separate reachability files 1004, 1005. A first of the reachability files 1004 comprises a plurality of records of compliant VLAN identifier tags 1010. A second of the reachability files 1005 comprises a plurality of records of non-compliant VLAN identifier tags 1002. As clients are "pinged" and status changes, respective VLAN identifier tags 1010, 1002 are moved from one reachability file 1004, 1005 to the other. Before transmitting a message, a server 100 need only search the first reachability files 1004 containing a list of compliant VLAN identifiers 1010. If a VLAN identifier tag 1010 is not found in the first reachability file 1004, it is necessarily non-compliant or not presently on the network. Because the second reachability file 1005 need not be searched, a two-file system can reduce execution time when performing a status check.

Figure 11:
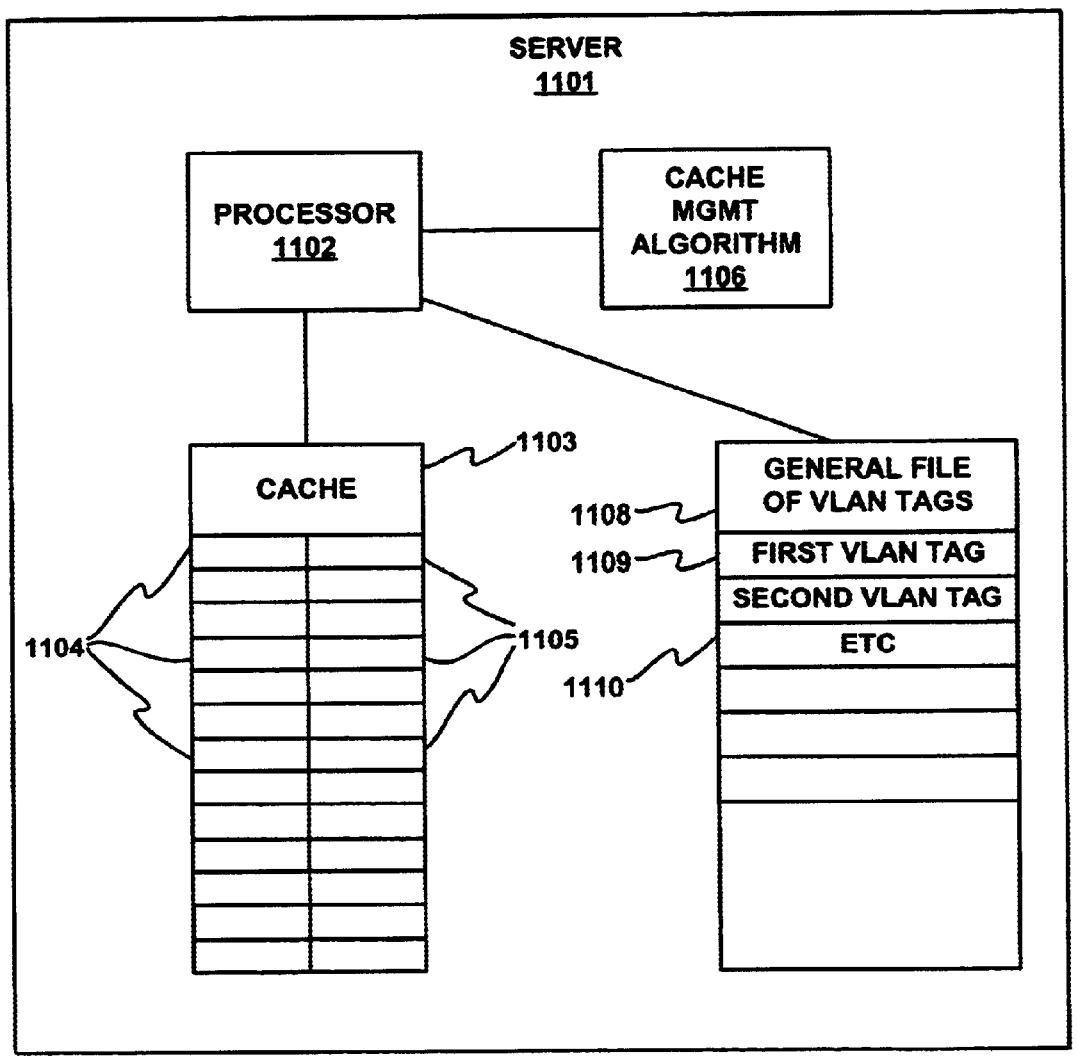
FIG. 11 depicts one embodiment of a memory structure and organization as envisioned with the present invention wherein priority identifier tags and their respective attributes are stored in a cache type memory, and non-priority tags are stored in a more general area of memory implemented in accordance with one embodiment of the present claimed invention.

Referring now to FIG. 11, one embodiment of the memory structure and organization as envisioned with the present invention comprises a cache type memory 1103. A "cache" typically refers to an area of memory that can be more quickly accessed by the microprocessor than other areas of memory. Some microprocessors have a cache memory integral to the microprocessor. Within a random access memory, data stored in a "higher" area of memory are more quickly accessed by a microprocessor. The use of the term "cache" 1103 herein is not intended to be limited to any one embodiment of cache memory, but rather, comprises to any type or area of memory, existing or to be developed in the future, that is more rapidly accessible than the memory area used to store the general file of VLAN tags 1108.

Various factors may be used to establish the need for rapid access to certain VLAN identifier tags 1104. Reliable communication with certain clients may be more critical than other clients, thereby requiring a more frequent status upgrade through the use of VLAN ping/echo packets 400. Alternatively, certain clients may be known to receive more frequent transmissions from the server than others. For example, if the vital signs of a patient in intensive care were transmitted a monitoring room, the transmissions would be both frequent, and critical. According to the embodiment being discussed herein, before the server transmits a data packet 300, the server must check the memory area memory to determine the status of the perspective client. To optimize computer speed and reduce the time invested in each status check, a status check being performed frequently would best be conducted if the respective VLAN identifier tag were in a cache type memory that could be accessed quickly.

According to one embodiment of the present invention, the cache 1103 would be static. In a static cache, upon booting, the computer would load the VLAN identifier tags 1104 of specific client computers into the cache 1103, and they would remain in the cache 1103. These VLAN tags 1104 would be selected for any number of properties such as critically of communication, or frequency of communication.

According to one embodiment, the cache 1103 is dynamic in nature. VLAN identifier tags 1104 stored in the cache memory 1103 would be constantly changing with tags 1110 stored in the general file of VLAN tags 1108. The determination of which VLAN identifier tags 1104, 1110 to move into or out of the cache is made by a cache management algorithm 1106. Additionally, the cache management algorithm 1106 could control how frequently the status of a given tag need be updated. Factors used by the cache management algorithm might include, but would not be limited to: how long it has been since the last data transmission to a specific client computer, how many data transmissions incorporating a particular VLAN identifier tag had taken place over some specific time period, and a priority rating of a given tag.

Each VLAN identifier tag 1104 in the cache 1103 has a corresponding set of attributes. These attributes include, in the very least, the compliance-status of the various VLAN identifier tags 1104. In the preferred embodiment, the attributes 1105 would also include the data necessary for effective operation of the cache management system 1106. According to the preferred embodiment, attributes for VLAN tags 1104 stored in the cache would themselves be stored within the cache memory. It is however envisioned that select attributes could be stored in other areas of memory with pointers connecting them to the VLAN tags 1104 stored within the cache 1103.

Figure 12:
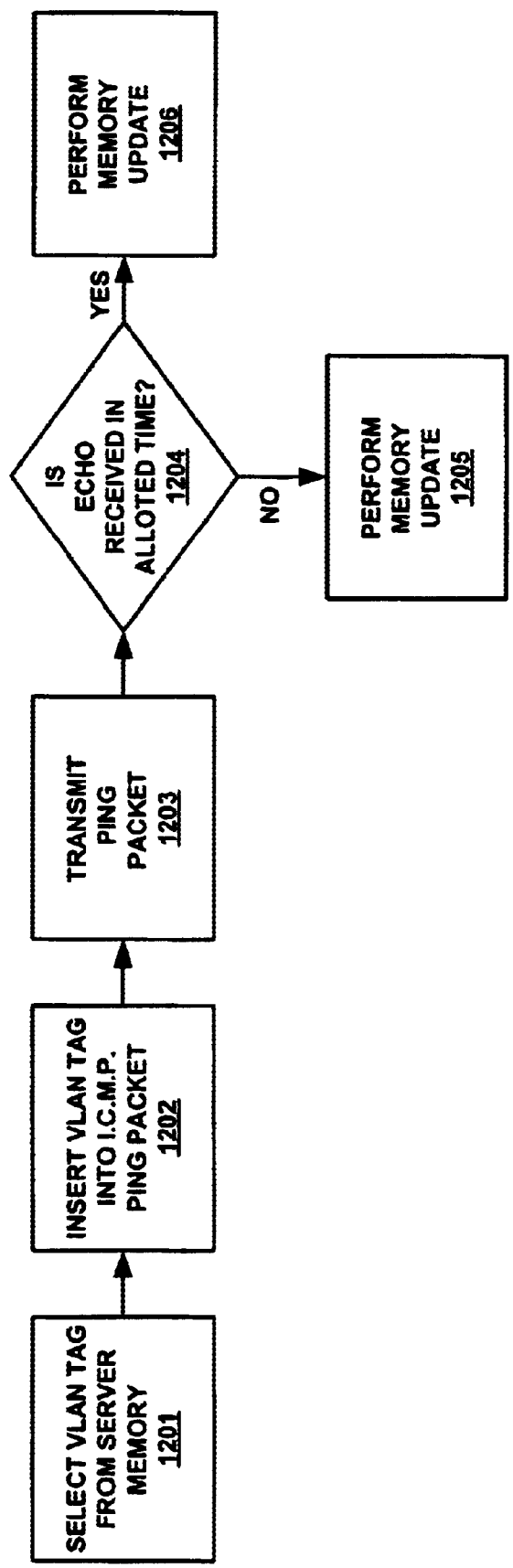
FIG. 12 depicts a flow chart of a dynamic (ongoing) ping-echo memory update of client status implemented in accordance with one embodiment of the present claimed invention.

FIG. 12 depicts a flow chart of a dynamic or ongoing ping-echo memory update of client status. These steps are performed to establish client status at regular intervals as determined by a program (not shown). A memory update is performed, and any change in status may also be recorded. According to this embodiment, upon receipt of a message awaiting transmission, the server would confirm the client status simply by examining the client status recorded in the server memory.

This embodiment can be used advantageously in an environment wherein a client computer which receives roughly one message per second. Transmitting a VLAN ping/echo packet every second prior to the data transmission would, in most instances, be unnecessary, and would unnecessarily burden a network with excess traffic. If the network were already near maximum capacity, and every message were preceded by a VLAN ping/echo packet, the number of communications across the network would effectively double, thereby overwhelming the network. Accordingly, the process disclosed in FIG. 12 is predicated upon a program generating VLAN ping/echo packets at an optimum rate that insures frequent update of client status while not burdening the network with unnecessary inquiries.

In step 1201 of FIG. 12, a VLAN ping-echo manager (not shown) selects a VLAN identifier tag from memory.

In step 1202 of FIG. 12, the VLAN tag is inserted into the header 406 of a packet containing an I.C.M.P. ping packet, forming a VLAN echo/ping packet 400.

In step 1203 of FIG. 12, The VLAN echo/ping packet 400 is transmitted onto the network 800.

In step 1204 of FIG. 12, the server 801 determines if an echo ping is received within a predetermined time. If an echo is received within the predetermined time, the client is determined to be compliant. If no echo is received in the allotted time, the client is determined to be non compliant. The time will configurable according to the needs of a given network. Although configurable to any length, in the preferred embodiment, the allotted time will be between 1 second and 255 seconds.

In steps 1205 and 1206, the server memory is examined, and if necessary, the status of that particular VLAN identifier tag is upgraded changed. The memory upgrade is not limited to client status however, and includes all changes in memory resulting from the transmission of the VLAN ping/echo packet, including upgrading various cache attributes utilized in various embodiments of the present invention.

Figure 13:
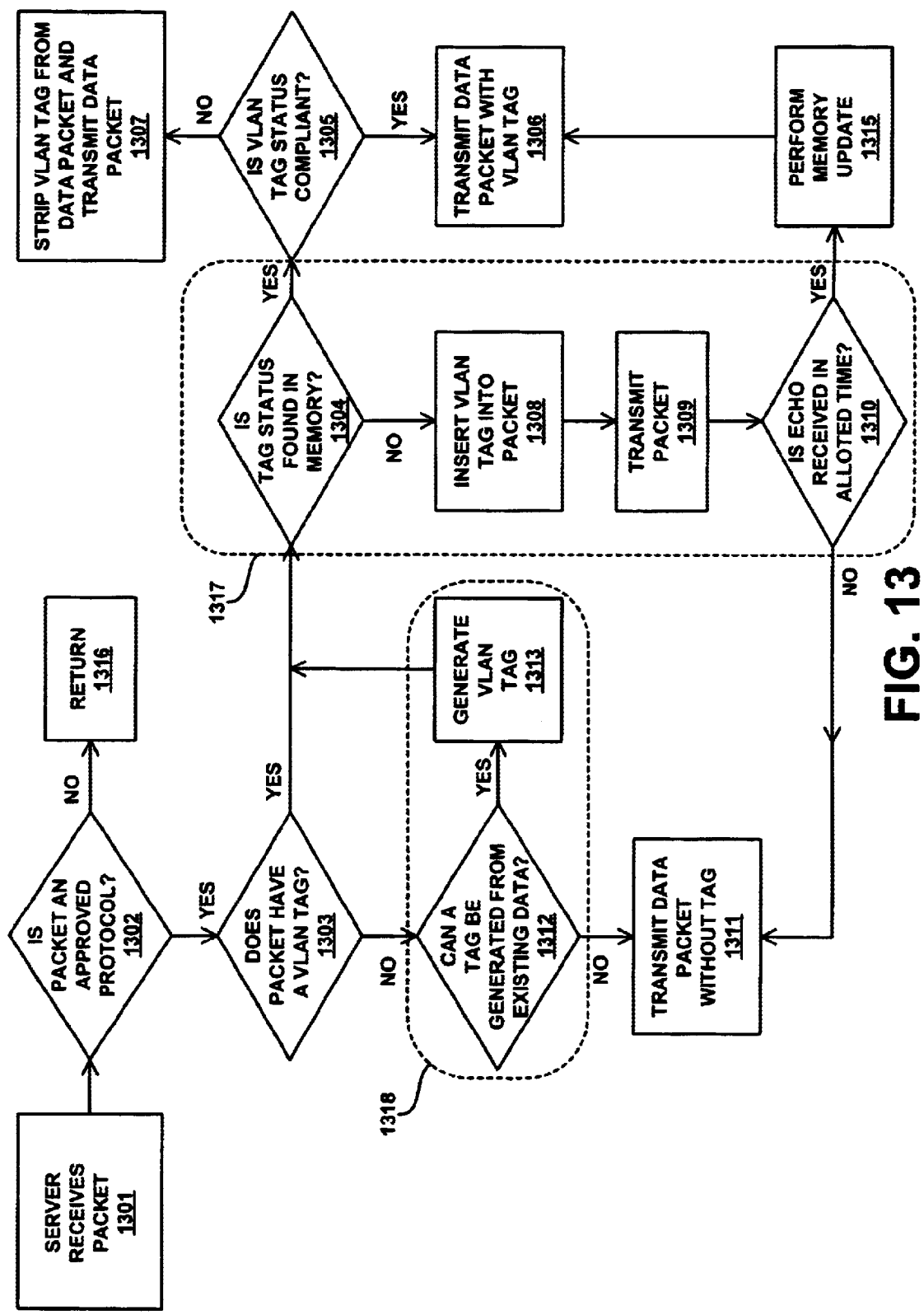
FIG. 13 depicts a flow chart wherein client status is determined upon receipt of a data packet in accordance with one embodiment of the present claimed invention.

FIG. 13 depicts a flow chart wherein client status is checked before the transmission of each data packet. The utility of this process can be illustrated by considering a network wherein certain critical clients must be updated frequently, but other clients very infrequently. A memory structure as illustrated in FIG. 11 could be advantageously used in such a situation, with frequently updated VLAN tags stored in a static cache 1103. The cache management algorithm 1106 would update the status of those VLAN tags at regular intervals prescribed by the cache management algorithm 1106. On the other hand, clients that receive perhaps two messages per day need not be updated at frequent intervals. The VLAN tags for those clients would be stored in the general file of VLAN tags 1108. In the case of these VLAN tags, a VLAN ping/echo packet being transmitted twice a day, just prior to transmission of the data packet, would burden the network far less than unnecessarily updating the status of these VLAN tags every seven to ten minutes.

According to the above example, it should be seen that the processes described in FIGS. 12 and 13 may be used simultaneously by the same server, and should not be construed as mutually exclusive.

In step 1301 of FIG. 13, the server receives a packet for transmission onto the network. The packet may be generated from within the server, or received in transmission from another source.

In step 1302 of FIG. 13, the packet is examined to determine if it is an approved protocol for the process disclosed in FIG. 13. Because some networks are "closed," prohibiting non-approved protocols from being transmitted on the network, step 1302 is optional, and in many cases it will not be needed. If step 1302 is executed however and the packet is not approved, the program initiates step 1316. If the packet is an approved protocol, the program initiates step 1303.

In step 1316 of FIG. 13, the microprocessor 101 terminates the process disclosed in FIG. 13, and returns the microprocessor 101 to its next task.

In step 1303 of FIG. 13, the packet is examined to determine if it has a VLAN tag. If the packet has a VLAN tag, the process advances to step 1304. If the packet does not have a VLAN tag, the process advances to step 1312. It is to be remembered that this process is not exclusive to VLAN tags, and can be applied to any network or sub-net identifier tag.

In step 1312 of FIG. 13, the information in the packet is examined to determine if a VLAN tag can be generated from the data present in the packet. If such tag generation is possible the process advances to step 1313. If tag generation is no possible, the process advances to step 1311.

In step 1311 of FIG. 13, the data packet is transmitted without a VLAN identifier tag.

In step 1313 of FIG. 13, a VLAN tag 303 is generated from information contained in the packet 306. The process then advances to step 1304.

In step 1304 of FIG. 13, the VLAN tag in the packet is compared to the status of that VLAN tag in the server memory. If the tag is found to be compliant, the process advances to step 1305. If the tag is found to be non-compliant, the process advances to step 1308.

In step 1308 of FIG. 13, the VLAN tag 303 is inserted into a packet 306 containing in I.C.M.P. ping packet 304 in the data payload. The resultant packet is the VLAN ping/echo packet 400 disclosed in FIG. 4.

In step 1309 of FIG. 13, the server transmits the VLAN ping/echo packet 400 onto the network 814.

In step 1310 of FIG. 13, the server 801 determines if an echo ping is received within a predetermined time. If an echo is received within the predetermined time, the client is determined to be compliant, and the process advances to step 1315. If no echo is received in the allotted time, the client is determined to be non compliant, and the process advances to step 1311 (discussed supra). Although configurable to any length, in the preferred embodiment, the allotted time will be between 1 second and 255 seconds.

In step 1315 of FIG. 13, the server 801 performs a memory update. If a memory structure conforms closely to the embodiment disclosed in FIG. 9, the update may be limited to checking the status of flags and updating flag status where necessary. If a memory structure conforming to the embodiment disclosed in FIG. 11 is utilized, the memory update may be more involved, comprising an update of various VLAN tag attributes, and, if the cache memory is dynamic in nature, possibly a file move of certain VLAN tags and attributes. The process then advances to step 1306.

In step 1306 of FIG. 13, the server transmits the data packet 300 with a VLAN tag 303 in the packet header 306.

In step 1304 of FIG. 13, the server examines the memory to determine if the VLAN tag 303 within the data packet 300 is found in memory. If it exists, the process advances to step 1305. If no such VLAN tag exists in the computer memory, the process advances to step 1308. Alternatively, if no such tag is found to exist in memory, the process may terminate (path not shown), returning to step 1316.

In step 1305 of FIG. 13, the server determines if the VLAN tag 303 in the data packet 300 awaiting transmission is compliant by comparing it to the VLAN tags stored in the server memory. If the VLAN tag 303 is compliant, the process advances to step 1306 (discussed supra). If the VLAN tag 303 is non-compliant, the process advances to step 1307.

In step 1307 of FIG. 13, the server strips the VLAN tag 303 from the data packet 300, and transmits a "tag-free" data packet 306.

Figure 14:
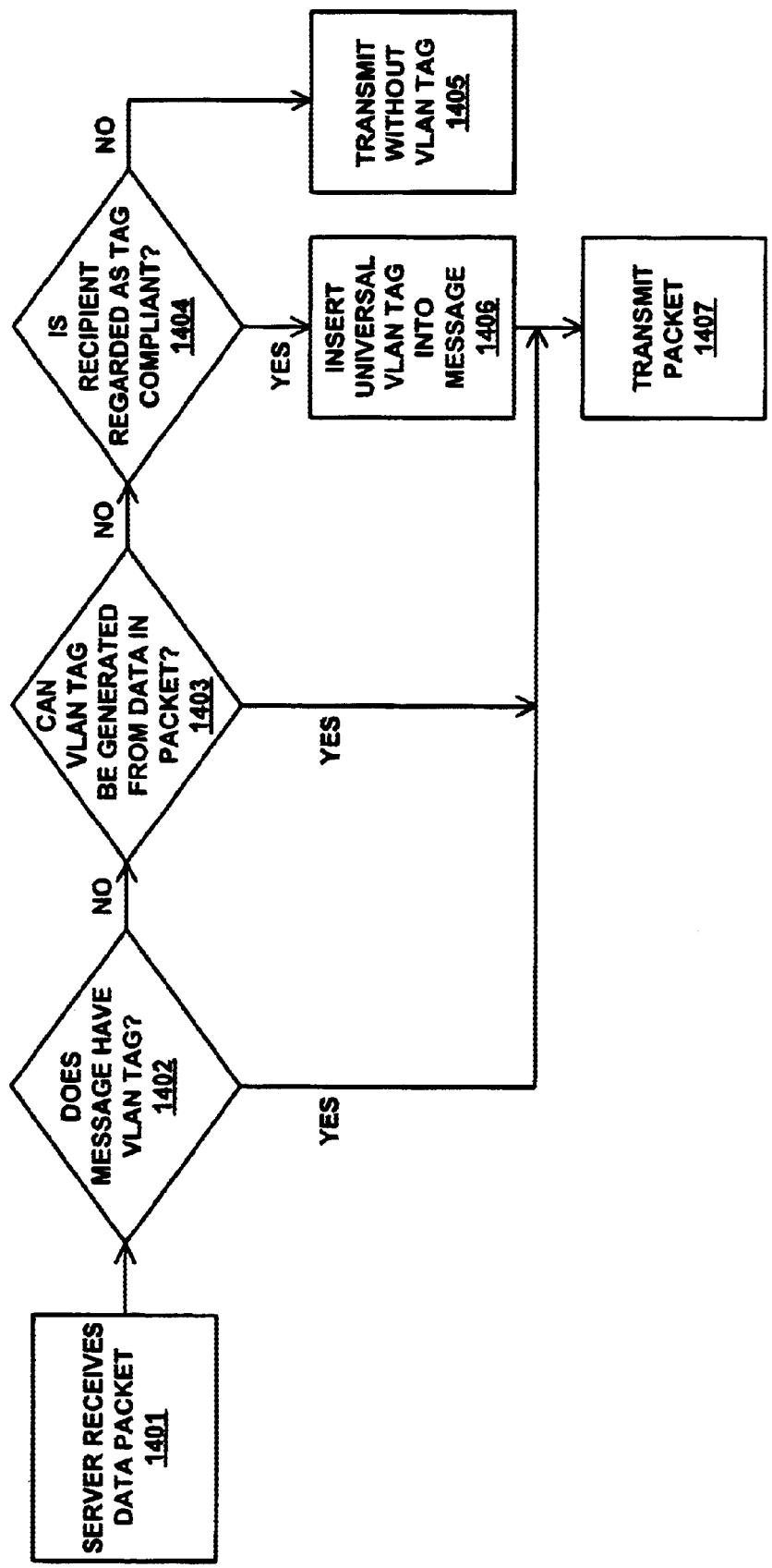
FIG. 14 depicts a flow chart for inserting a universal VLAN tag into data packets implemented in accordance with one embodiment of the present claimed invention.

FIG. 14 depicts a flow chart for inserting a universal VLAN tag into data packets. The entire process disclosed in FIG. 14 is optional. The process involves inserting a "universal VLAN tag" into a packet header. The universal VLAN tag comprises a generic bit pattern that is the same size as the data field typically comprising a VLAN tag. The purpose of this process is to alter a transmission packet into a format recognizable by computers that are configured to respond exclusively to data transmissions comprising a VLAN tag in the header. The process disclosed in FIG. 14 is not concerned with options which depart from this goal. Accordingly, the affirmative paths extending from steps 1402 and 1403, which were already developed in FIG. 13, are not duplicated in FIG. 14.

In step 1401 of FIG. 14 the server receives a data packet that is to be transmitted onto the network. The data packet may have been generated within the server itself, or may have been received in transmission. Following step 1401, the process advances to step 1402.

In step 1402 of FIG. 14, the server determines if the data packet has a VLAN tag in the header. If no tag is present, the process advances to step 1403.

In step 1403 of FIG. 14, the server determines whether or not a VLAN tag can be generated from data already present in the packet. If no VLAN tag can be generated, the process advances to step 1404.

In step 1404 of FIG. 14, the server determines whether the intended recipient of the data transmission is VLAN tag-compliant. If compliance is unlikely, the process advances to step 1405. If compliance is believed likely, the process advances to step 1406. Factors used in determining the likelihood of compliance are determined by the individual programmer, as is the algorithm used to determine compliance. Such decision making algorithms are commonly known to those skilled in the art.

In step 1405 the data packet is transmitted without a VLAN tag.

In step 1406 the sever inserts a universal VLAN tag into the header of the data packet.

In step 1407 the server transmits the packet.

It should be understood that the process as disclosed in FIG. 14 should not be construed as to prohibit dual transmission of the same message in different formats, including a "tag-less" packet and a packet containing a universal VLAN tag. Although dual paths have not been included in FIG. 14, it is understood that such an option, though not shown, is available if it were expedient for a given network.

It should further be understood that any of the various steps or processes disclosed in FIGS. 12, 13 and. 14 may be omitted if they do not conform to the objectives or capabilities of the network server. Similarly, it is to be understood that the specification of certain steps in FIGS. 12, 13 and 14 does not preclude the inclusion of additional steps therein.

What is claimed is:

1. In a server computer comprising a processor, a memory, said server computer communicatively coupled to a plurality of client computers in a network, a method for detecting reachability of client computers comprising:

storing a first reachability file comprising a plurality of records, wherein each record indicates a status of each "compliant" client computer;

storing a second reachability file comprising a plurality of records, wherein each record indicates a status of each "non-compliant" client computer generating a first data packet with an I.C.M.P. packet for a data payload;

selecting a first identifier tag from among a select plurality of identifier tags stored within said first reachability file or said second rechability file;

inserting said first identifier tag into a proper data segment of said first data packet, thereby forming a first tagged ping packet;

transmitting said first tagged ping packet to a first client computer;

determining whether said first client computer is "compliant" or "non-compliant" from a response to said first tagged ping packet;

moving one of said plurality of records of said first reachability file, corresponding to said first client computer, to said second reachability file if said first client computer is determined to be "non-compliant" ; and moving one of said plurality of records of said second reachability file, corresponding to said first client computer, to said first reachability file if said first client computer is determined to be "compliant".

2. The method for detecting reachability of clients according to claim 1, further comprising deriving said first identifier tag from an incoming message prior to inserting said first identifier tag into said first data packet.

3. The method for detecting reachability of clients according to claim 1, further comprising:

receiving a subsequent message containing an incoming identifier tag;

searching said first reachability file for said incoming identifier tag;

determining the status of said incoming identifier tag from said first reachability file;

providing said incoming identifier tag is "compliant", re-transmitting said subsequent message; and providing incoming identifier tag is "non-compliant", removing said incoming identifier tag from said subsequent message and re-transmitting said subsequent message without an identifier tag.

4. The method for detecting reachability of clients according to claim 1, further comprising:

receiving a subsequent message lacking an identifier tag;

generating an identifier tag from data contained in said subsequent message;

determining the status of said generated identifier tag comparing said generated identifier tag to said select plurality of identifier tags stored within in said first reachability file or said second reachability file;

providing said generated identifier tag is "compliant", inserting said generated identifier tag into said subsequent message and re-transmitting said subsequent message; and providing said generated identifier tag is "non-compliant", re-transmitting said subsequent message without an identifier tag.

5. The method for detecting reachability of clients according to claim 1, further comprising:
  receiving a subsequent message lacking an identifier tag;
  inserting a universal identifier tag into a proper data segment of said message; and
  re-transmitting said subsequent message.

6. The method for detecting reachability of clients according to claim 1, wherein:
  said memory comprises a cache type memory;
  said method further comprises;
    selecting a first priority record from said select plurality of records in said first reachability file or said second reachability file; and
    storing said first priority record in said cache type memory.

7. The method for detecting reachability of clients according to claim 6, wherein said cache type memory is static.

8. The method for detecting reachability of clients according to claim 6, wherein said cache type memory is dynamic, said server computer further comprising a cache management algorithm and a first set of attributes corresponding to said first priority identifier tag in said cache type memory.

9. The method for detecting reachability of clients according to claim 1, wherein said network comprises a heterogeneous mix of "compliant" and "non-compliant" client computers.

10. The method for detecting reachability of clients according to claim 1, wherein said identifier tag is an 802.1 q/P identifier tag.

11. A networked server system comprising:
  a server computer comprising;
    a server memory for storing a first and second reachability file each comprising a plurality of records, wherein each record comprises a tag identifier corresponding to one of a plurality of client computers;
    a server processor operatively connected to said server memory, for performing a process comprising;
      selecting a first identifier tag from among a select plurality of identifier tags stored within said first reachability file or said second rechability file;
      inserting said first identifier tag into a proper data segment of said first data packet, thereby forming a first tagged ping packet;
      transmitting said first tagged ping packet to a first client computer;
      determining whether said first client computer is "compliant" or "non-compliant" from a response to said first tagged ping packet;
      moving one of said plurality of records of said first reachability file, corresponding to said first client computer, to said second reachability file if said first client computer is determined to be "non-compliant";
      moving one of said plurality of records of said second reachability file, corresponding to said first client computer, to said first reachability file if said first client computer is determined to be "compliant";
      receiving a subsequent message containing an incoming identifier tag;
      determining the status of said incoming identifier tag by comparing said incoming identifier tag to a select plurality of identifier tags stored within said first reachability file or said second reachability file;
      providing said incoming identifier tag is "compliant", re-transmitting said subsequent message; and
      providing said incoming identifier tag is "non-compliant", removing said incoming identifier tag from said subsequent message and re-transmitting said subsequent message without an identifier tag; and
    at least one transmission port operatively connected to said server processor; and
  said first client computer comprising;
    a client processor; and
    a client transmission port operatively connected to said client processor; and
  a transmission means operatively connecting said at least one transmission port of said server to said transmission port of said client.

12. The server computer system according to claim 11, wherein said processor performs said process further comprises deriving said first identifier tag from an incoming message prior to inserting said first identifier tag into said first data packet.

13. The server computer system according to claim 11, wherein said processor performs said process farther comprising:
  receiving a subsequent message lacking an identifier tag;
  generating an identifier tag from data contained in said subsequent message;
  determining the status of said generated identifier tag by comparing said generated identifier tag to a select plurality of identifier tags stored within said first reachability file or said second reachability file;
  providing said generated identifier tag is "compliant", inserting said generated identifier tag into said subsequent message and re-transmitting said subsequent message; and
  providing said generated identifier tag is "non-compliant", re-transmitting said subsequent message without an identifier tag.

14. The server computer system according to claim 11, wherein process further comprises:
  receiving a subsequent message lacking an identifier tag;
  inserting a universal identifier tag into a proper data segment of said subsequent message; and
  re-transmitting said subsequent message.

15. The server computer system according to claim 11, wherein:
  said server computer further comprises a cache type memory; and
  said process further comprises;
    selecting a first priority record from said plurality of records; and
    storing said first priority record in said cache type memory.

16. The server computer system according to claim 15, wherein said cache type memory further comprises a first set of attributes, said first set of attributes corresponding to said first priority identifier tag.

17. The server computer system according to claim 11, wherein said systems network comprises a heterogeneous mix of "compliant" and "non-compliant" client computers.

18. The server computer system according to claim 12, wherein said identifier tag is an 802.1 q/P identifier tag.

19. A computer-readable medium containing a plurality of instructions which when executed cause a server computer to implement a method for detecting reachability of a client computer comprising:

generating a first data packet within said server computer, said data packet having an I.C.M.P. packet for a data payload;

selecting a first identifier tag from among a plurality of identifier tags stored in a select one of a first or second reachability file;

inserting a first identifier tag into a proper data segment of said first data packet, thereby forming a first tagged ping packet;

transmitting said first tagged ping packet to a first client computer;

determining an updated status of said first client computer as "compliant" or "non-compliant" from a response to said first tagged ping packet;

moving one of a plurality of records of said first reachability file, corresponding to said first client computer, to said second reachability file if said first client computer is determined to be "non-compliant";

moving one of a plurality of records of said second reachability file, corresponding to said first client computer, to said first reachability file if said first client computer is determined to be "non-compliant".

20. The computer-readable medium according to claim 19, further comprising deriving said first identifier tag from an incoming message prior to inserting said first identifier tag into said first data packet.

21. The computer-readable medium according to claim 19, further comprising:

receiving a subsequent message containing an incoming identifier tag;

determining the status of said incoming identifier tag by comparing said incoming identifier tag to said select plurality of identifier tags stored within said first reachability file or said second reachability file;

providing said incoming identifier tag is "compliant", re-transmitting said subsequent message; and providing said incoming identifier tag is "non-compliant", removing said incoming identifier tag from said subsequent message and re-transmitting said subsequent message without an identifier tag.

22. The computer-readable medium according to claim 19, further comprising:

receiving a subsequent message lacking an incoming identifier tag;

generating a generated identifier tag for said subsequent message from data in said subsequent message;

comparing said generated identifier tag to said select plurality of identifier tags stored within said first reachability file or said second reachability file;

determining the status of said generated identifier tag by comparing said generated identifier tag to said select plurality of identifier tags in said first reachability file or said second reachability file;

providing said generated identifier tag is "compliant", inserting said generated identifier tag into said subsequent message and re-transmitting said subsequent message; and providing said generated identifier tag is "non-compliant", re-transmitting said subsequent message without an identifier tag.

23. The computer-readable medium according to claim 19, further comprising:

receiving a subsequent message lacking an incoming identifier tag;

inserting a universal identifier tag into a proper data segment of said subsequent message; and re-transmitting said subsequent message.

24. The computer-readable medium according to claim 19, further comprising:

selecting a first priority record from said select plurality of records stored within said first reachability file or said second reachability file; and storing said first priority record in a cache type memory.

25. The computer-readable medium according to claim 24, said cache type memory is static.

26. The computer-readable medium according to claim 24, wherein said cache type memory is dynamic, and further comprising a cache management algorithm and a first set of attributes corresponding to said first priority identifier tag in said cache type memory.

* * * * *